United States Patent
Lee et al.

(10) Patent No.: US 11,305,707 B2
(45) Date of Patent: Apr. 19, 2022

(54) STRUCTURE FOR SHIELDING SIDE SILL FOR SLIDING DOOR VEHICLE

(71) Applicants: Hyundai Motor Company, Seoul (KR); Kia Motors Corporation, Seoul (KR)

(72) Inventors: Jae-Seung Lee, Hwaseong-si (KR); Kyu-Hoon Cho, Suwon-si (KR); Seung-Sik Han, Hwaseong-si (KR); Dae-Hee Lee, Incheon (KR); Yong-Hyun Nam, Anyang-si (KR); Chung-Sik Yim, Anyang-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 0 days.

(21) Appl. No.: 17/021,291

(22) Filed: Sep. 15, 2020

(65) Prior Publication Data

US 2021/0380048 A1    Dec. 9, 2021

(30) Foreign Application Priority Data

Jun. 8, 2020    (KR) .................. 10-2020-0069066

(51) Int. Cl.
   *B60J 5/06*    (2006.01)
   *B60R 13/06*   (2006.01)
   *B60R 13/04*   (2006.01)
   *B62D 25/02*   (2006.01)

(52) U.S. Cl.
CPC ............... *B60R 13/04* (2013.01); *B60J 5/06* (2013.01); *B60R 13/06* (2013.01); *B62D 25/025* (2013.01)

(58) Field of Classification Search
CPC .................................. B60J 5/06; B60R 13/06
USPC ........................................................ 296/155
See application file for complete search history.

(56) References Cited

U.S. PATENT DOCUMENTS

| 4,614,060 A | * | 9/1986 | Dumenil | ............... E06B 7/215 |
| | | | | 49/303 |
| 8,220,203 B2 | * | 7/2012 | Gase | ....................... B60J 5/06 |
| | | | | 49/360 |
| 8,561,351 B2 | * | 10/2013 | Heidrich | ............ B60J 5/0497 |
| | | | | 49/312 |

FOREIGN PATENT DOCUMENTS

| EP | 2088021 A2 * | 8/2009 | ............ B60J 5/06 |
| KR | 9721619 U | 6/1997 | |
| WO | WO-9401297 A1 * | 1/1994 | ........ B60R 21/207 |

* cited by examiner

*Primary Examiner* — Dennis H Pedder
(74) *Attorney, Agent, or Firm* — Slater Matsil, LLP

(57) ABSTRACT

A structure for shielding a side sill for a sliding door vehicle includes a lower rail mounted in an internal side sill space, a drive unit movably connected to the lower rail, and a shield structure including a cover unit having one end connected to the drive unit and guide rail units configured to guide the cover unit, wherein the cover unit covers the internal side sill space exposed in accordance with a movement of the drive unit.

17 Claims, 15 Drawing Sheets

STRUCTURE FOR SHIELDING SIDE SILL FOR SLIDING DOOR VEHICLE

CROSS-REFERENCE TO RELATED APPLICATIONS

This application claims priority to Korean Patent Application No. 10-2020-0069066, filed on Jun. 8, 2020, which application is hereby incorporated herein by reference.

TECHNICAL FIELD

The present invention relates to a structure for shielding a side sill for a sliding door vehicle.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

As illustrated in FIG. 1A, referring to a structure of a vehicle equipped with sliding doors, a lower rail 2 is provided in a longitudinal direction of a vehicle body, a drive unit 3 is movably connected to the lower rail 2, and a lower arm 4 is rotatably connected to the drive unit 3 and a door 1. Therefore, when external force is applied to the door 1, the drive unit 3 moves along the lower rail 2, thereby operating the door 1.

Meanwhile, side sills 5 are mounted at both sides of a lower portion of the vehicle body. The side sill 5 defines a closed cross section while including an inner side sill panel, an outer side sill panel, a reinforcing material, and the like. As illustrated in FIGS. 1B and 1C, an internal side sill space 6 is opened when the door 1 is opened. For this reason, there may be a problem in that foreign substances enter from the outside.

In order to solve the problem, Korean Utility Model Application Laid-Open No. 97-21619 (Structure for Preventing Foreign Substance from Entering Side Sill for Vehicle) discloses that a dust inflow prevention member fastened to a lower end of a door prevents foreign substances such as dust from entering a space portion formed in an upper portion of an outer panel that defines a side sill.

However, Korean Utility Model Application Laid-Open No. 97-21619 discloses a structure which is applied to a swing type opening/closing door among the opening/closing doors for a vehicle in the related art but cannot be applied to the vehicle equipped with the sliding doors.

SUMMARY

The present invention relates to a structure for shielding a side sill for a sliding door vehicle. Particular embodiments relate to a structure for shielding a side sill, which closes an internal side sill space in accordance with a movement of a sliding door, thereby preventing foreign substances from entering the side sill.

Embodiments of the present invention provide a new type of structure capable of preventing foreign substances from entering an internal side sill space for a sliding door vehicle.

Embodiments of the present invention provide a structure for shielding a side sill for a sliding door vehicle, the structure including a lower rail mounted in an internal side sill space, a drive unit movably connected to the lower rail, and a shield means including a cover unit having one end connected to the drive unit, and guide rail units configured to guide the cover unit, in which the cover unit covers the internal side sill space exposed in accordance with a movement of the drive unit.

The cover unit may have a bellows-shaped structure.

A first guide space may be formed in the lower rail so that the cover unit moves in the first guide space.

The shield means may include a cover arm connected to one end of the cover unit, and cover rods having both ends so as to be rotatably connected to the drive unit and the cover arm.

The cover arm may have cover connectors connected to one end of the cover unit.

Each of the guide rail units may have a shape curved outward from the inside of the internal side sill space.

The guide rail units may have second guide spaces into which two lateral portions of the cover unit are inserted and moved.

The guide rail units may be formed at both sides of the cover unit in a width direction.

A size of a cross section of each of two lateral portions of the cover unit may be smaller than a size of a cross section of a central portion.

According to embodiments of the present invention, the internal side sill space may be always closed while the door moves, thereby preventing external foreign substances from entering the internal side sill space.

According to embodiments of the present invention, the structure of the cover unit has a bellows shape, such that the cover unit may effectively close the internal side sill space while easily moving along the guide rail unit.

DETAILED DESCRIPTION OF ILLUSTRATIVE EMBODIMENTS

Hereinafter, a structure for shielding a side sill for a sliding door vehicle according to embodiments of the present invention will be described in detail with reference to the drawings. Terms or words used herein should not be interpreted as being limited to a general or dictionary meaning and should be interpreted with a meaning and a concept which conform to the technical spirit of the present invention based on a principle that an inventor can appropriately define a concept of a term in order to describe his/her own invention by the best method.

Figure 1A:
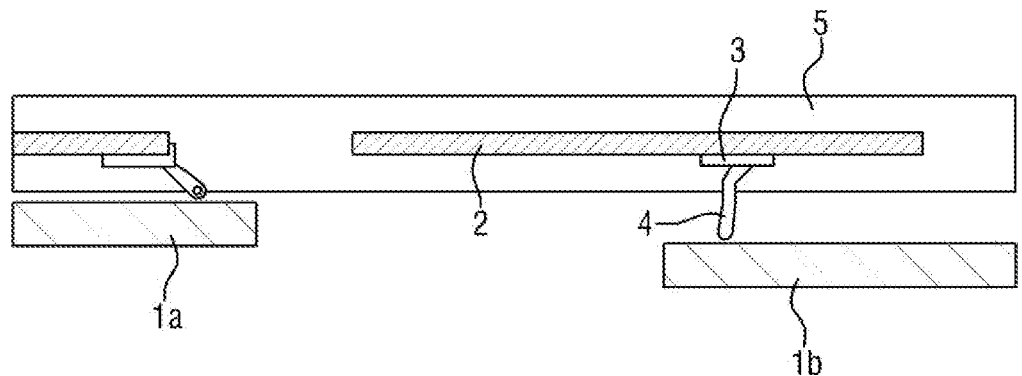
FIG. 1A is a view illustrating a state in which a sliding door operates.
Figure 1B:
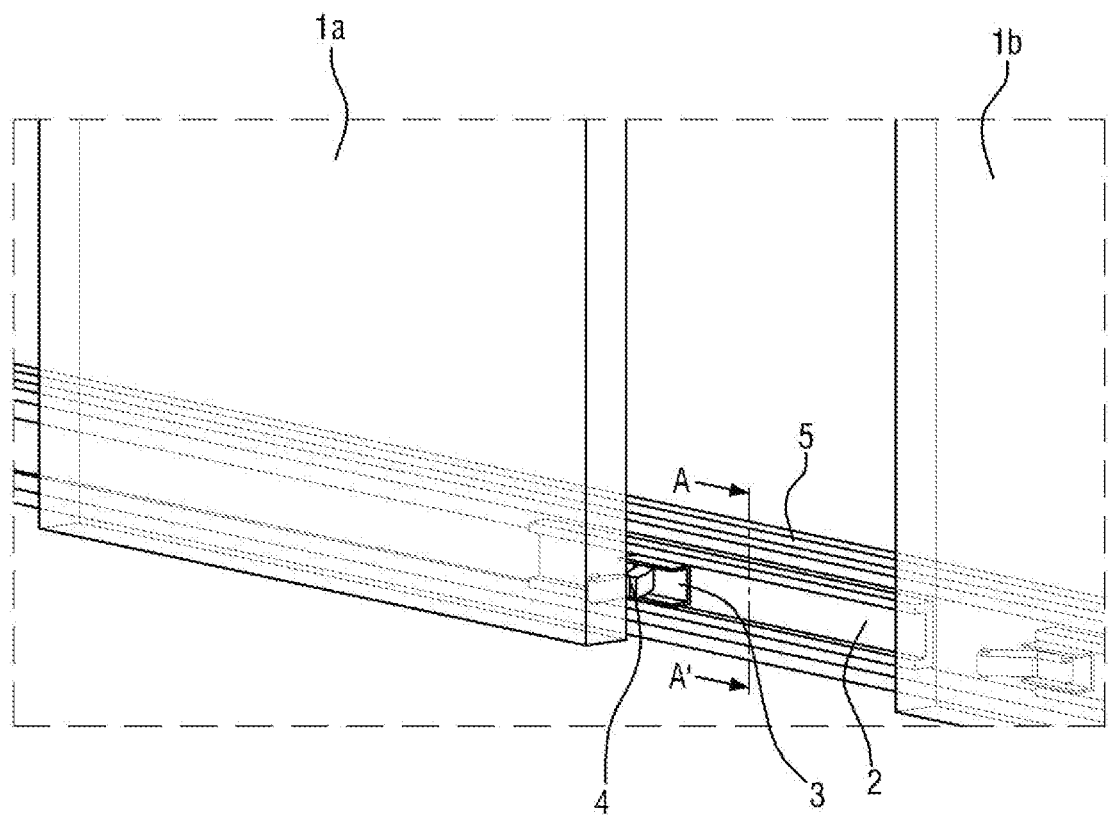
FIG. 1B is a view illustrating a state in which an internal side sill space is opened as a door is opened.
Figure 1C:
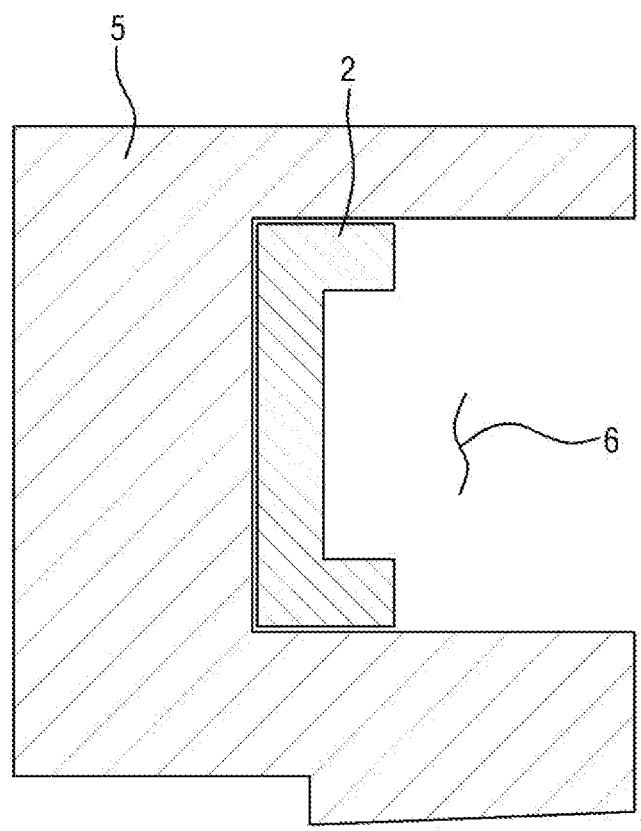
FIG. 1C is a cross-sectional view taken along line A-A' in FIG. 1B.
Figure 2:
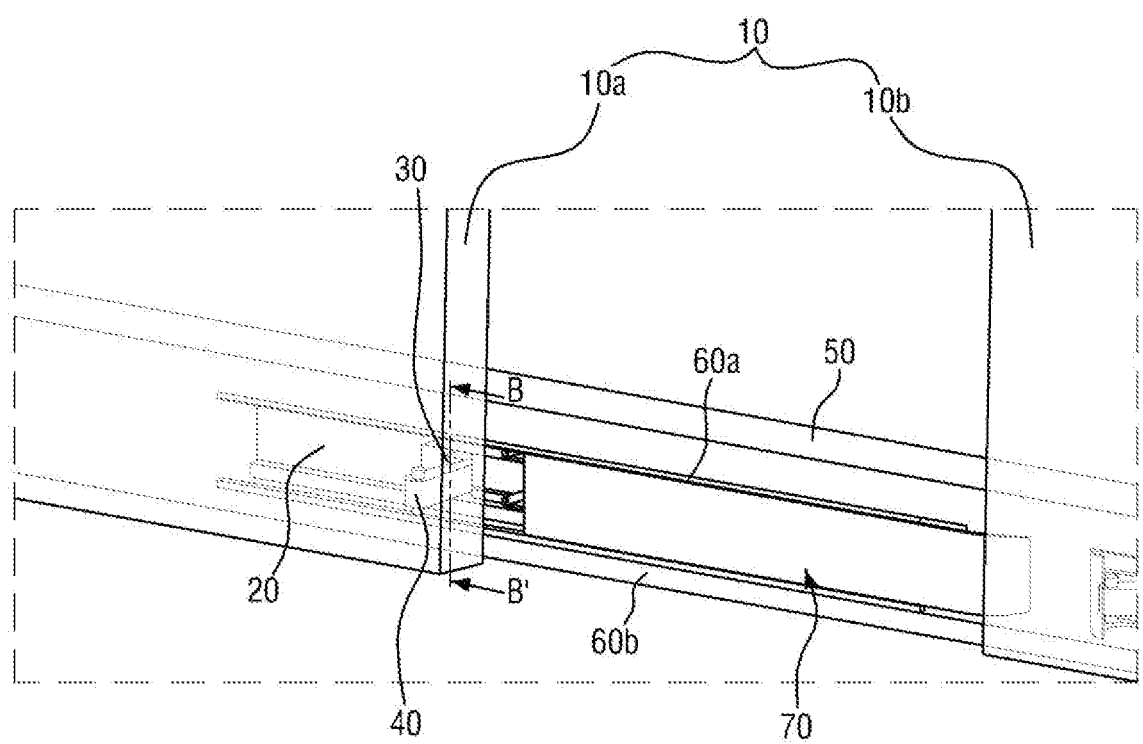
FIG. 2 is a view illustrating a structure for shielding a side sill for a sliding door vehicle according to an exemplary embodiment of the present invention.
Figure 3:
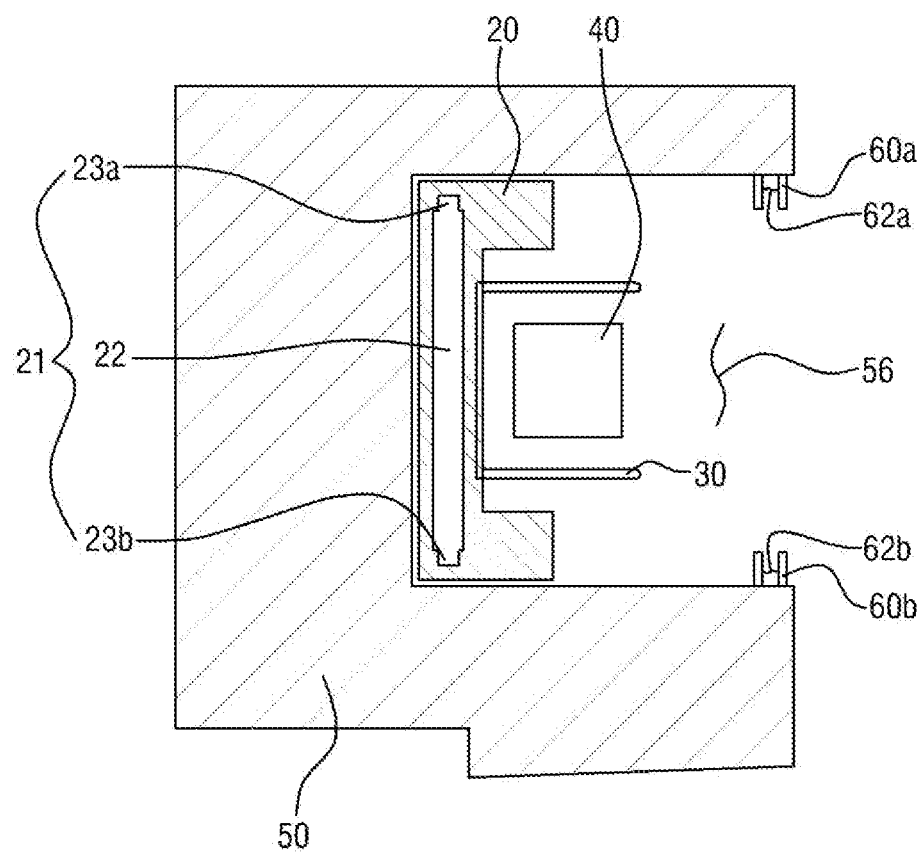
FIG. 3 is a cross-sectional view taken along line B-B' in FIG. 2.
Figure 4:
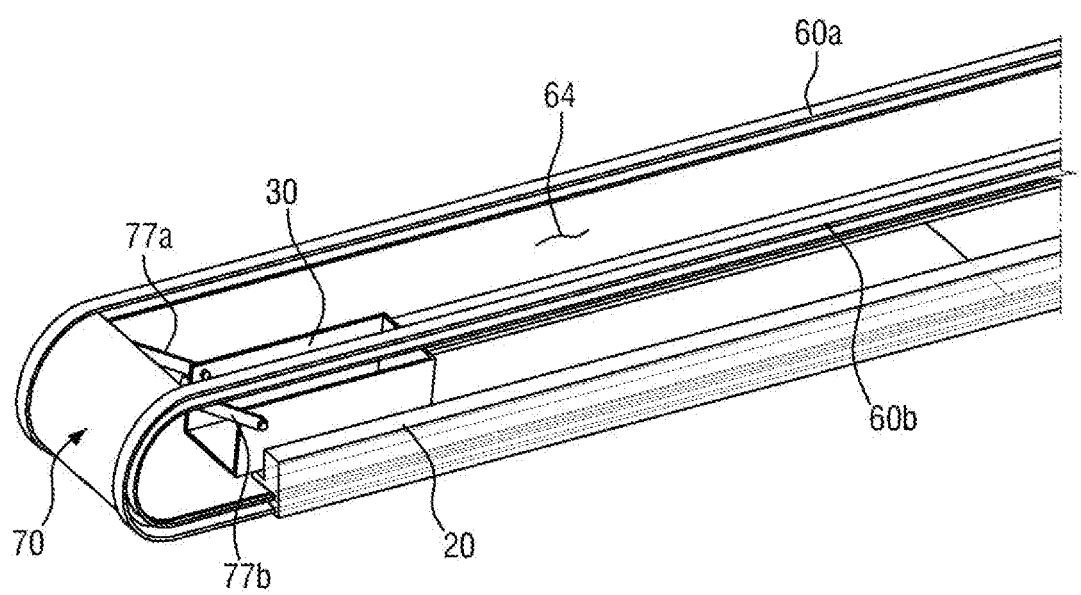
FIG. 4 is a view illustrating a state in which the structure for shielding a side sill according to an exemplary embodiment of the present invention operates.
Figure 5:
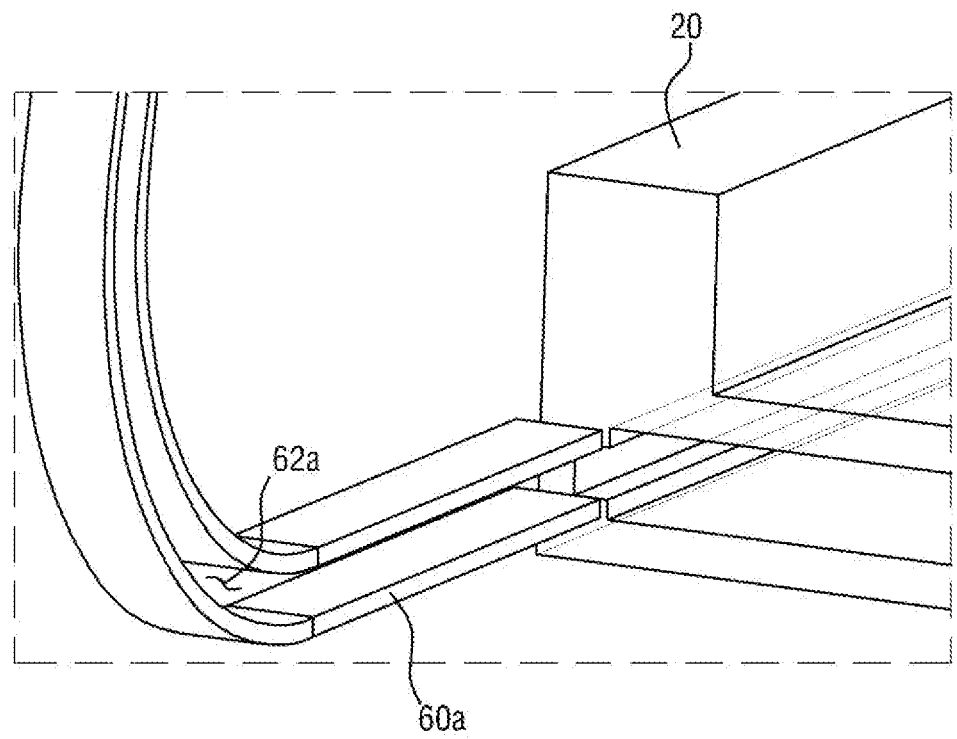
FIG. 5 is a view illustrating a state in which a guide rail unit and a lower rail are connected.

FIG. 2 is a view illustrating a structure for shielding a side sill for a sliding door vehicle according to an exemplary embodiment of the present invention, FIG. 3 is a cross-sectional view taken along line B-B' in FIG. 2, FIG. 4 is a view illustrating a state in which the structure for shielding a side sill according to an exemplary embodiment of the present invention operates, and FIG. 5 is a view illustrating a state in which a guide rail unit and a lower rail are connected. In this case, in FIGS. 4 and 5, some configurations are omitted for ease of description.

Referring to FIG. 2, a structure for shielding a side sill for a sliding door vehicle according to an exemplary embodiment of the present invention includes a lower rail 20, a drive unit 30, and a shield means.

In an internal side sill space 50 formed in a sliding door vehicle, the lower rail 20 is mounted in a longitudinal direction of a vehicle body. The drive unit 30 is movably connected to the lower rail 20. In this case, the drive unit 30 may have a roller (not illustrated), and the roller may be rollably connected to the lower rail 20. One end of a lower arm 40 is rotatably connected to the drive unit 30, and the other end of the lower arm 40 is rotatably connected to a door 10. Therefore, when external force is applied to the door 10 in one direction, the drive unit 30 may move along the lower rail 20.

Meanwhile, the structures for shielding a side sill, which are applied to a front door 10a and a rear door 10b, are identical in configuration to each other except that the structures for shielding a side sill have the directions opposite to each other. Therefore, in the present specification, the description will be made focusing on any one door 10.

Referring to FIG. 3, a first guide space 21, which is a movement route for a cover unit 70, is formed in the lower rail 20. The first guide space 21 includes a central portion 22 and two lateral portions 23a and 23b. The first guide space 21 is formed in a longitudinal direction of the lower rail 20, and a cross section of the first guide space 21 is approximately identical to a cross section of the cover unit 70. The first guide space 21 may be sized to enable the cover unit 70 to easily move. The two lateral portions 23a and 23b of the first guide space 21 are formed to have a smaller size than the central portion 22.

The shield means serves to close the internal side sill space 50 in accordance with the movement of the door 10 and includes guide rail units 60a and 60b and the cover unit 70.

The guide rail units 60a and 60b are configured to guide the movement of the cover unit 70 and positioned at both sides of the cover unit 90. Referring to FIGS. 4 and 5, the guide rail units 60a and 60b are connected to ends of the lower rail 20 in one direction (in a direction in which the door is closed). The guide rail units 60a and 60b are curved outward from the inside of the internal side sill space 50 and then extend in the longitudinal direction of the lower rail 20. A closing side 64, which is to be closed by the cover unit 70, is formed between the two guide rail units 60a and 60b. The structures of the guide rail units 60a and 60b do not interfere with the lower rail 20, the drive unit 30, and the lower arm 40.

The two guide rail units 60a and 60b face each other and are formed at both sides of the cover unit 70, and each of the guide rail units 60a and 60b has two rails. Referring to FIG. 5, second guide spaces 62a and 62b each are formed between the two rails. A size of each of the second guide spaces 62a and 62b is approximately equal to a size of each of the two lateral portions 23a and 23b of the first guide space 32.

Figure 6:
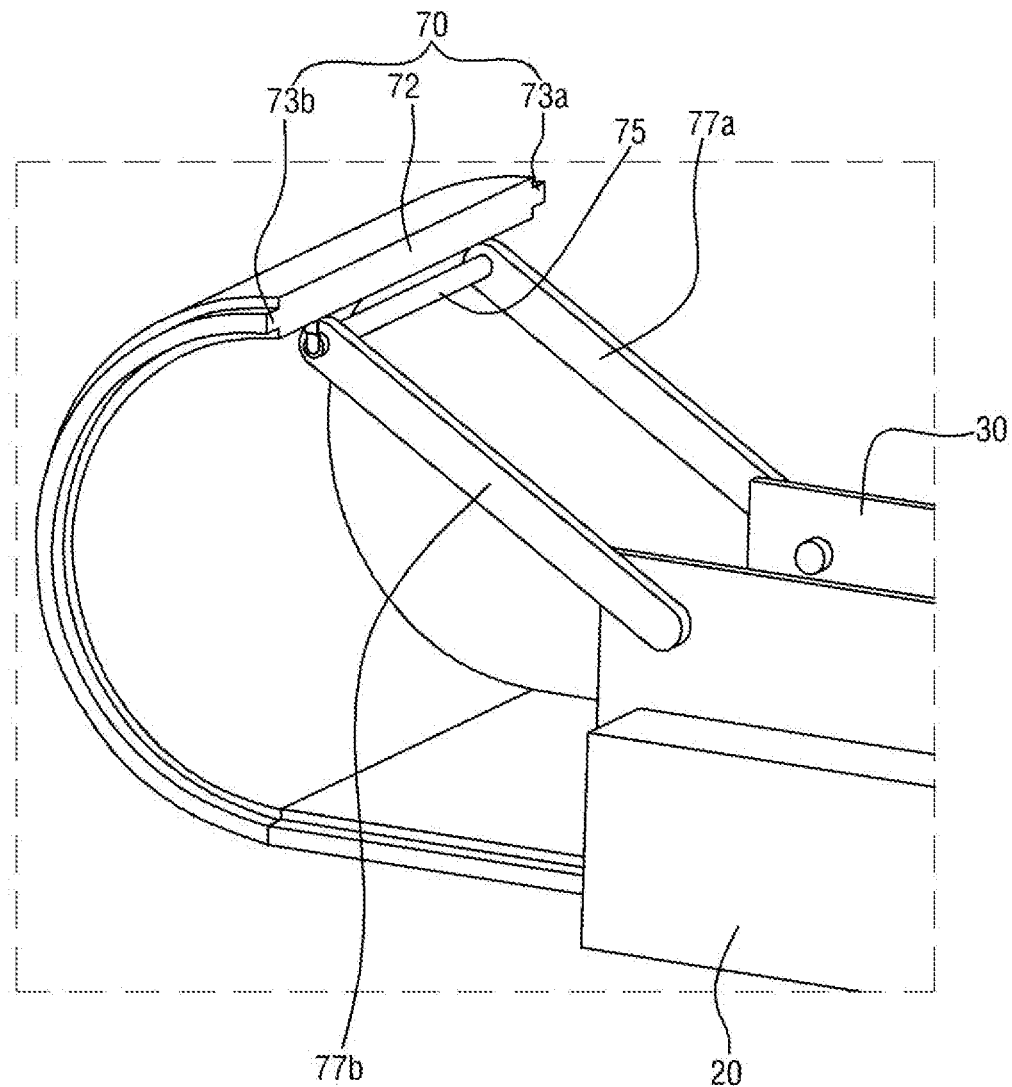
FIG. 6 is a view illustrating a state in which a cover unit and a drive unit are connected.
Figure 7:
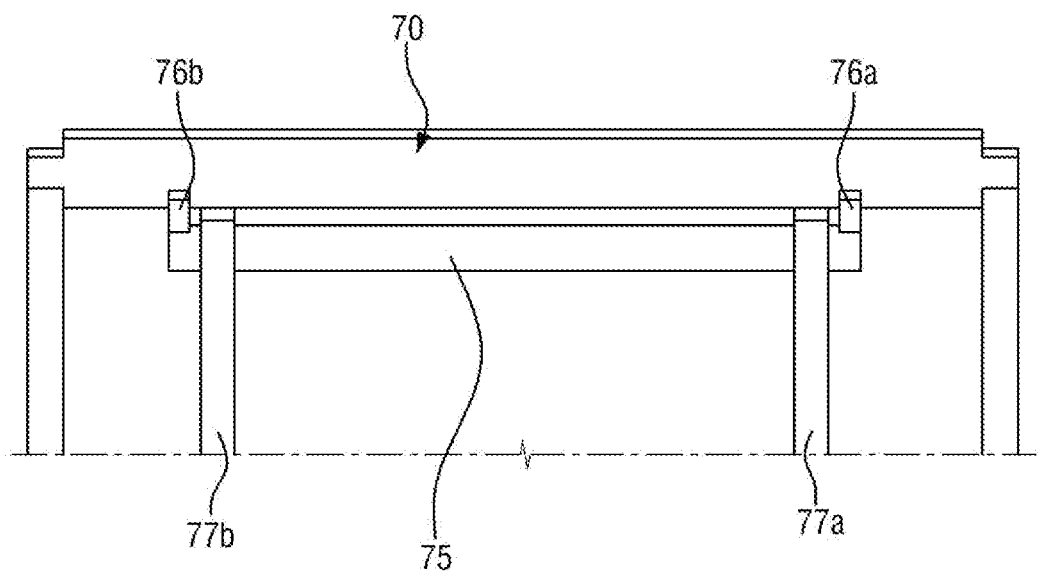
FIG. 7 is a view illustrating a state in which the cover unit and a cover arm are connected.

FIG. 6 is a view illustrating a state in which the cover unit and the drive unit are connected, and FIG. 7 is a view illustrating a state in which the cover unit and a cover arm are connected.

Referring to FIGS. 6 and 7, the cover unit 70 includes a central portion 72 and two lateral portions 73a and 73b. The cover unit 70 may be inserted into the first guide space 21, such that the cover unit 70 may move in the lower rail 20. In addition, the two lateral portions 73a and 73b of the cover unit 70 may be inserted into the second guide spaces 62a and 62b, such that the cover unit 70 may move along the guide rail units 60a and 60b. As illustrated in FIG. 6, since the guide rail units 60a and 60b are connected to the ends of the lower rail 20 in one direction, the cover unit 70 may move in the lower rail 20 and along the guide rail units 60a and 60b.

One end of the cover unit 70 is connected to a cover arm 75 by means of cover connectors 76a and 76b. One end of a cover rod 77a and one end of a cover rod 77b are rotatably connected to the cover arm 75, and the other end of each of the cover rods 77a and 77b is rotatably connected to the drive unit 30. Therefore, when the drive unit 30 moves along the lower rail 20, one end of the cover unit 70 may move along the guide rail units 60a and 60b, and the cover rods 77a and 77b may rotate in accordance with the shapes of the guide rail units 60a and 60b. In an exemplary embodiment of the present invention, the two cover rods 77a and 77b are connected to the single cover arm 75. However, the number of cover arms 75, the number of cover rods 77a and 77b, and the method of connecting the cover arm 75 and the cover rods 77a and 77b are not limited.

The material and the shape of the cover unit 70 are not limited as long as the cover unit 70 may close the internal side sill space 50. However, the cover unit 70 may be made of a flexible material so as to smoothly move along the curved shapes of the guide rail units 60a and 60b, and the cover unit 70 may have sufficient rigidity so as to move in one direction or the other direction along the guide rail units 60*a* and 60*b*. According to another exemplary embodiment of the present invention, the cover unit 70 may have a foldable (bellows-shaped) structure.

Meanwhile, according to another exemplary embodiment of the present invention, the central portion 72 and the two lateral portions 23*a* and 23*b* of the cover unit 70 may have a shape (e.g., a rectangular shape) having an equal size, or the central portion 22 and the two lateral portions 23*a* and 23*b* of the first guide space 21 may have a shape (e.g., a rectangular shape) having an equal size.

Figure 8:
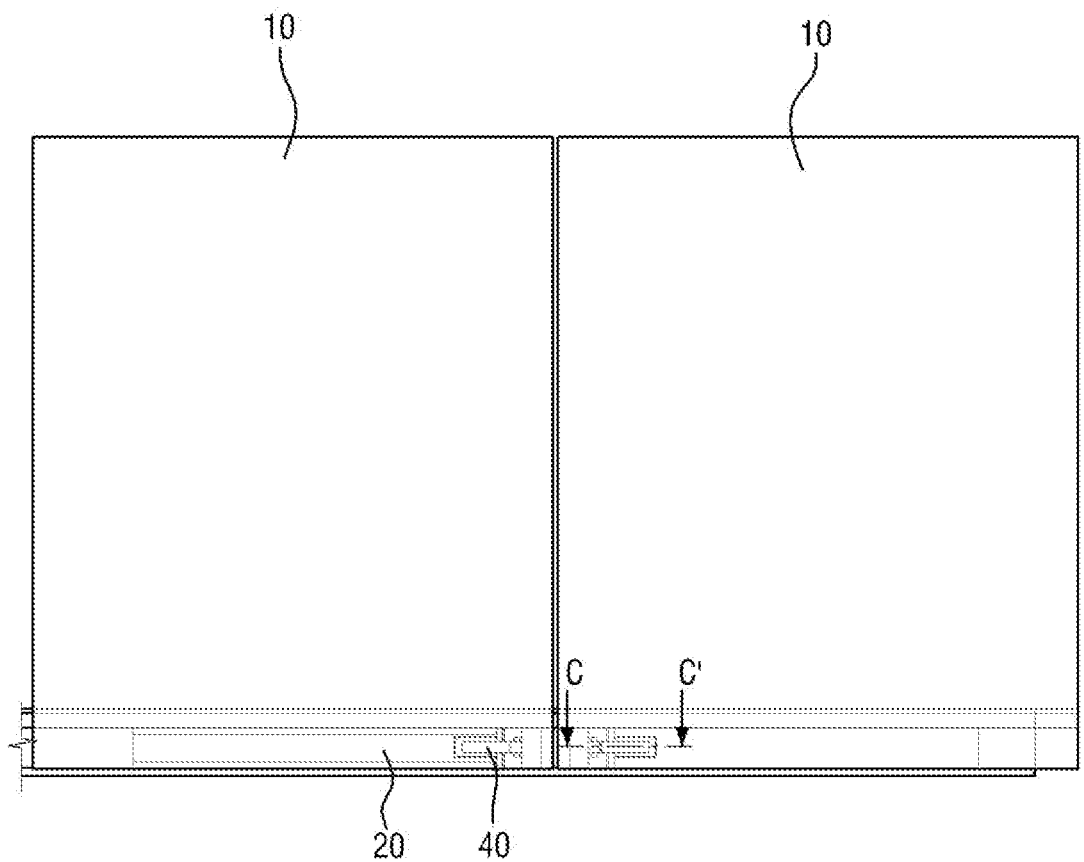
FIG. 8 is a view illustrating a state in which the structure for shielding a side sill according to an exemplary embodiment of the present invention is mounted when a sliding door is closed.
Figure 9:
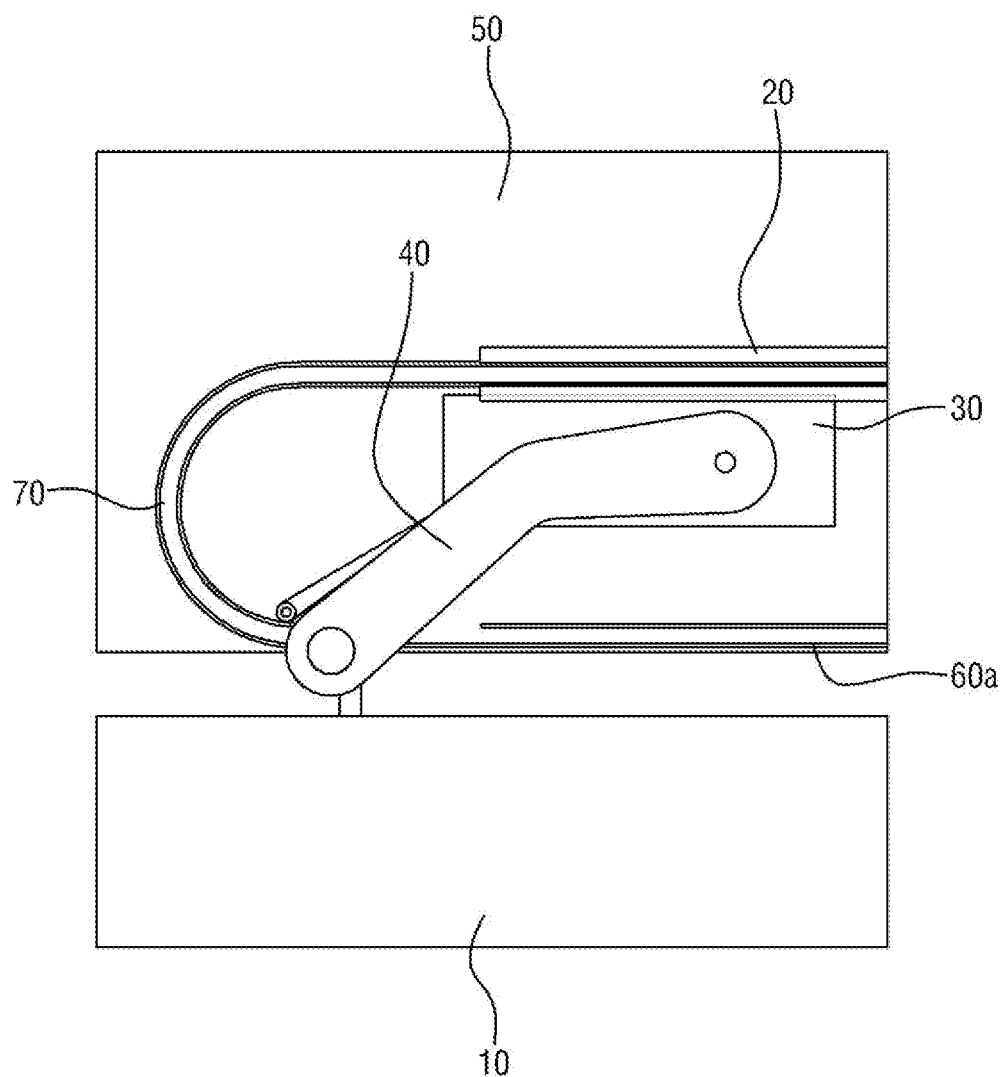
FIG. 9 is a cross-sectional view taken along line C-C' in FIG. 8.
Figure 10:
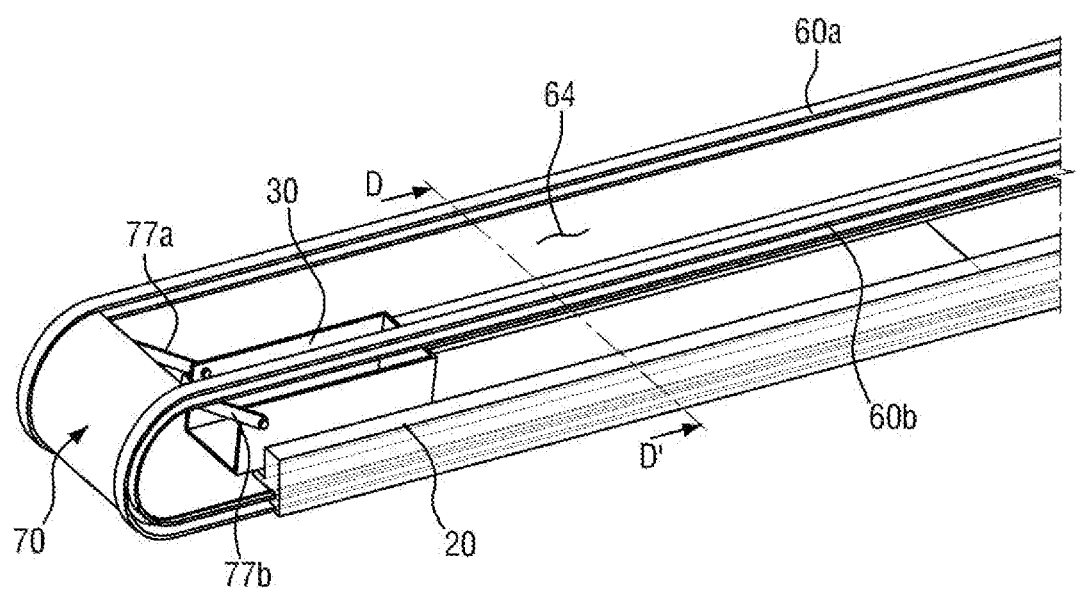
FIG. 10 is a view illustrating a state in which the structure for shielding a side sill illustrated in FIG. 8 operates.
Figure 11:
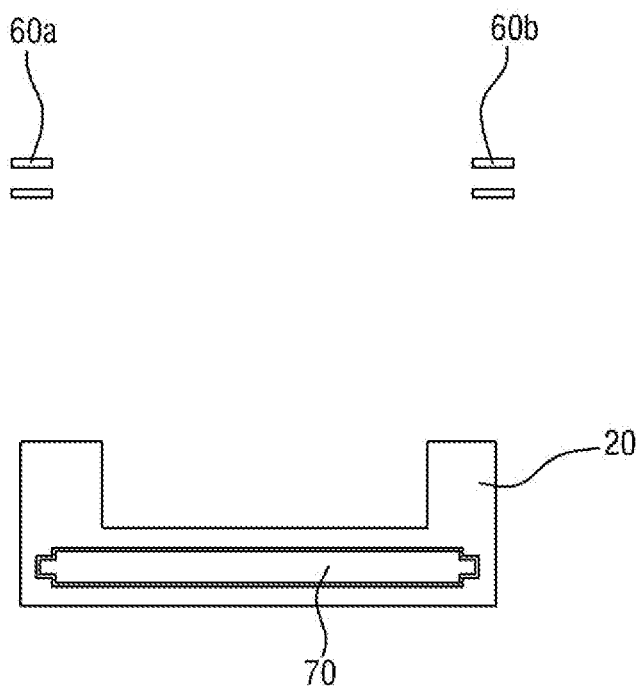
FIG. 11 is a cross-sectional view taken along line D-D' in FIG. 10.

FIG. 8 is a view illustrating a state in which the structure for shielding a side sill according to an exemplary embodiment of the present invention is mounted when the sliding door is closed, FIG. 9 is a cross-sectional view taken along line C-C' in FIG. 8, FIG. 10 is a view illustrating a state in which the structure for shielding a side sill illustrated in FIG. 8 operates, and FIG. 11 is a cross-sectional view taken along line D-D' in FIG. 10.

Hereinafter, a state of the structure for shielding a side sill when the door 10 is closed will be described with reference to FIGS. 8 to 11.

Referring to FIGS. 8 and 9, in the state in which the door 10 is closed, the drive unit 30 is positioned in the vicinity of the end of the lower rail 20 in one direction, and the lower arm 40 is folded in one direction. Because the internal side sill space 50 is in a state of being closed by the door 10, it is not necessary for the cover unit 70 to close the internal side sill space 50.

As illustrated in FIGS. 10 and 11, most parts of the cover unit 70 are positioned in the lower rail 20 through the first guide space 21, and one end of the cover unit 70 is positioned on the curved portions of the guide rail units 60*a* and 60*b*. Of course, the points on the guide rail units 60*a* and 60*b*, at which one end of the cover unit 70 is positioned in the state in which the door 10 is closed, may be variously set in accordance with types of vehicles and methods of designing vehicles. The closing side 64 is in an exposed state because the cover unit 70 does not move along the guide rail units 60*a* and 60*b*. FIG. 11 illustrates a cross section at the point at which the cover unit 70 is positioned in the lower rail 20 without being positioned on the guide rail units 60*a* and 60*b*.

Figure 12:
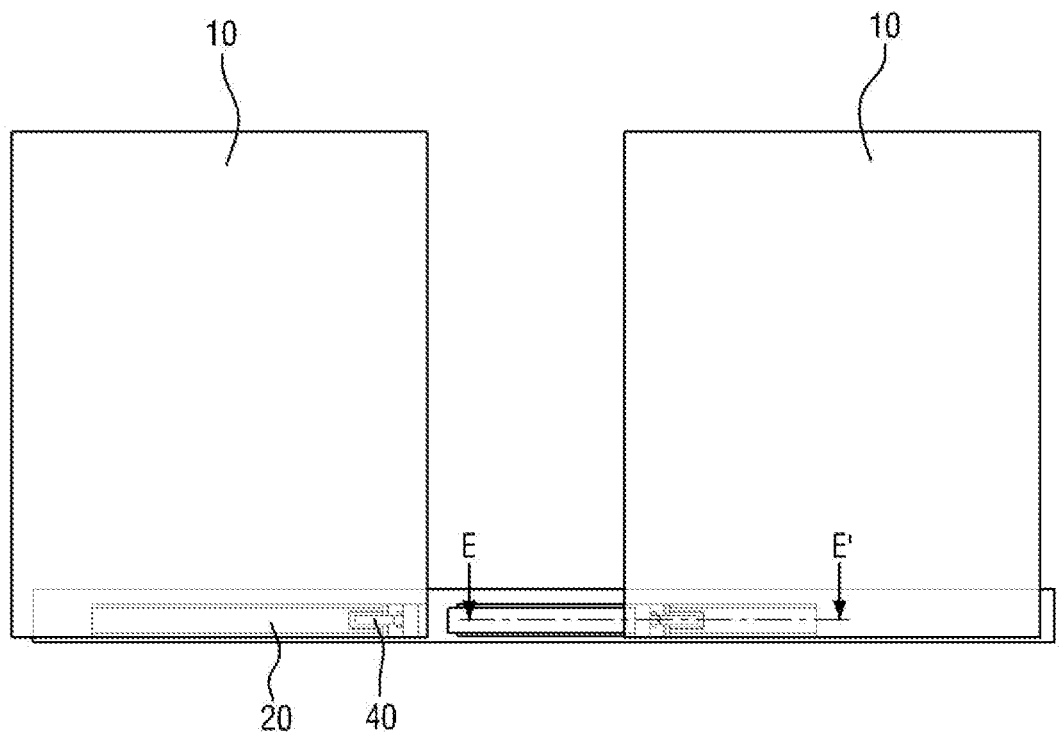
FIG. 12 is a view illustrating a state in which the structure for shielding a side sill according to an exemplary embodiment of the present invention is mounted when the sliding door is opened.
Figure 13:
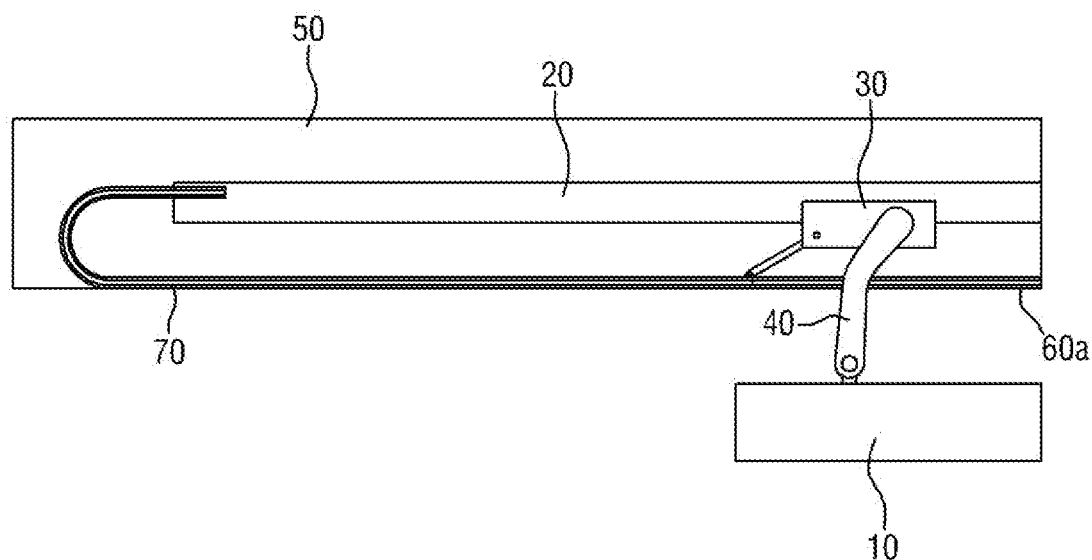
FIG. 13 is a cross-sectional view taken along line E-E' in FIG. 12.
Figure 14:
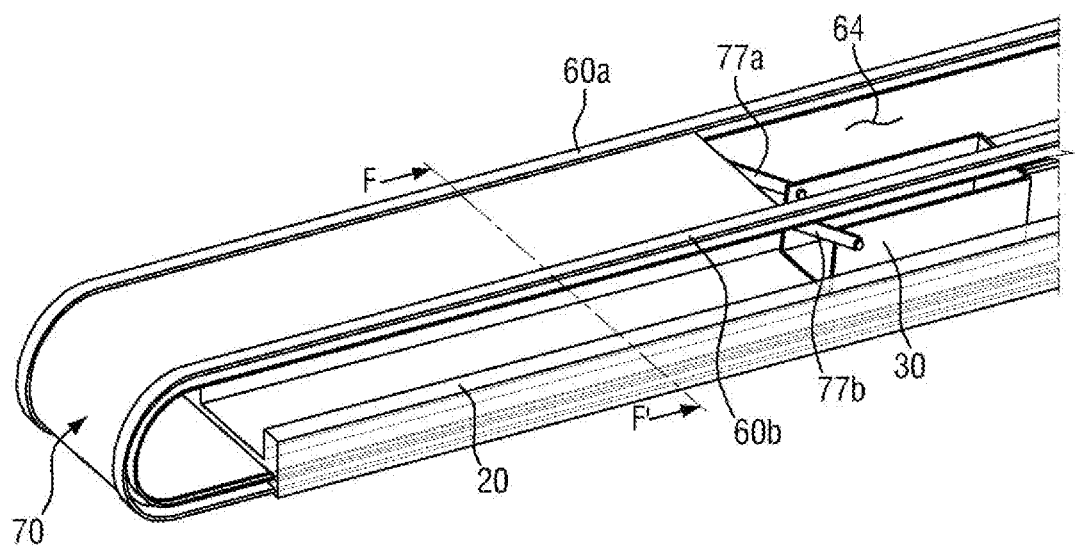
FIG. 14 is a view illustrating a state in which the structure for shielding a side sill illustrated in FIG. 12 operates.
Figure 15:
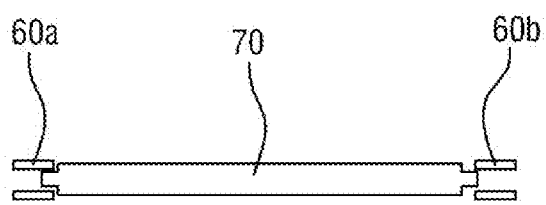
FIG. 15 is a cross-sectional view taken along line F-F' in FIG. 14.
Figure 15:
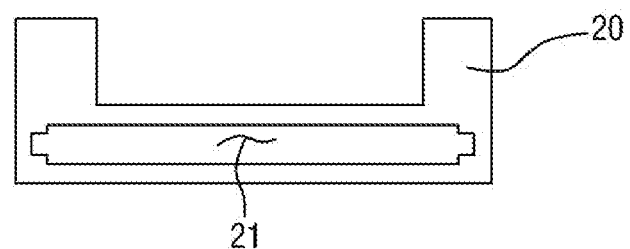

FIG. 12 is a view illustrating a state in which the structure for shielding a side sill according to an exemplary embodiment of the present invention is mounted when the sliding door is opened, FIG. 13 is a cross-sectional view taken along line E-E' in FIG. 12, FIG. 14 is a view illustrating a state in which the structure for shielding a side sill illustrated in FIG. 12 operates, and FIG. 15 is a cross-sectional view taken along line F-F' in FIG. 14.

Hereinafter, a process of operating the structure for shielding a side sill when opening the door 10 will be described with reference to FIGS. 12 to 15.

Referring to FIGS. 12 and 13, when external force is applied in a direction in which the door 10 is opened from the state in which the door 10 is closed, the lower arm 40 rotates in the other direction and then applies force to the drive unit 30, and the drive unit 30 to which the force is applied moves in the other direction of the lower rail 20. In this case, since the drive unit 30 is connected to one end of the cover unit 70, the cover unit 70 moves along the guide rail units 60*a* and 60*b* while covering the closing side 64.

As illustrated in FIGS. 14 and 15, the cover unit 70 is extended from the inside of the lower rail 20 to the extent to which the cover unit 70 moves along the guide rail units 60*a* and 60*b*. FIG. 15 illustrates a cross section at the point at which the cover unit 70 is positioned on the guide rail units 60*a* and 60*b* without being positioned on the lower rail 20.

Thereafter, when the door 10 is completely opened, the cover unit 70 completely covers the closing side 64. In this case, a length of the cover unit 70 received in the lower rail 20 may be variously set in accordance with types of work.

On the contrary, a process of moving the door 10 from the opened state to the closed state is performed by reversing the above-mentioned process. Therefore, when the door 10 moves in the direction in which the door 10 is closed, the cover unit 70 is inserted into the lower rail 20 to the extent to which the cover unit 70 moves along the guide rail units 60*a* and 60*b*.

According to embodiments of the present invention, the internal side sill space 50 may be always closed while the door 10 moves, thereby preventing external foreign substances from entering the internal side sill space.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A structure for shielding a side sill for a sliding door vehicle, the structure comprising:
   a lower rail mounted in an internal side sill space;
   a drive unit movably connected to the lower rail; and
   a shield structure comprising a cover unit having one end connected to the drive unit and guide rail units configured to guide the cover unit, wherein the cover unit covers the internal side sill space exposed in accordance with a movement of the drive unit.

2. The structure of claim 1, wherein a first guide space is formed in the lower rail so that the cover unit moves in the first guide space.

3. The structure of claim 1, wherein the shield structure further comprises:
   a cover arm connected to one end of the cover unit; and
   cover rods having both ends configured to be rotatably connected to the drive unit and the cover arm.

4. The structure of claim 3, wherein the cover arm has cover connectors connected to the one end of the cover unit.

5. The structure of claim 1, wherein each of the guide rail units has a shape curved outward from the inside of the internal side sill space.

6. The structure of claim 1, wherein the guide rail units have second guide spaces into which two lateral portions of the cover unit are configured to be inserted and moved.

7. The structure of claim 1, wherein the guide rail units are formed at both sides of the cover unit in a width direction.

8. The structure of claim 1, wherein a size of a cross section of each of two lateral portions of the cover unit is smaller than a size of a cross section of a central portion.

9. A sliding door vehicle, the vehicle comprising:
   a vehicle body;
   a lower rail mounted in an internal side sill space along a longitudinal direction of the vehicle body;
   a drive unit movably connected to the lower rail; and
   a shield structure comprising a cover unit having one end connected to the drive unit and guide rail units configured to guide the cover unit, wherein the cover unit covers the internal side sill space exposed in accordance with a movement of the drive unit.

10. The vehicle of claim 9, wherein a first guide space is formed in the lower rail so that the cover unit moves in the first guide space.

11. The vehicle of claim 9, wherein the shield structure further comprises:
   a cover arm connected to one end of the cover unit; and
   cover rods having both ends configured to be rotatably connected to the drive unit and the cover arm.

12. The vehicle of claim 11, wherein the cover arm has cover connectors connected to the one end of the cover unit.

13. The vehicle of claim 9, wherein each of the guide rail units has a shape curved outward from the inside of the internal side sill space.

14. The vehicle of claim 9, wherein the guide rail units have second guide spaces into which two lateral portions of the cover unit are configured to be inserted and moved.

15. The vehicle of claim 9, wherein the guide rail units are formed at both sides of the cover unit in a width direction.

16. The vehicle of claim 9, wherein a size of a cross section of each of two lateral portions of the cover unit is smaller than a size of a cross section of a central portion.

17. A structure for shielding a side sill for a sliding door vehicle, the structure comprising:
   a lower rail mounted in an internal side sill space;
   a first guide space formed in the lower rail;
   a drive unit movably connected to the lower rail; and
   a shield structure comprising:
      a cover unit having one end connected to the drive unit, wherein the cover unit covers the internal side sill space exposed in accordance with a movement of the drive unit;
      guide rail units configured to guide the cover unit, the guide rail units having second guide spaces into which two lateral portions of the cover unit are configured to be inserted and moved;
      a cover arm connected to one end of the cover unit; and
      cover rods having both ends configured to be rotatably connected to the drive unit and the cover arm.

* * * * *

UNITED STATES PATENT AND TRADEMARK OFFICE
CERTIFICATE OF CORRECTION

PATENT NO. : 11,305,707 B2
APPLICATION NO. : 17/021291
DATED : April 19, 2022
INVENTOR(S) : Lee et al.

It is certified that error appears in the above-identified patent and that said Letters Patent is hereby corrected as shown below:

On the Title Page

Item (73), Assignees; delete "Cornoration" and insert --Corporation--.

Signed and Sealed this
Twenty-sixth Day of July, 2022

Katherine Kelly Vidal
*Director of the United States Patent and Trademark Office*